United States Patent [19]

Gartner

[11] Patent Number: 4,536,686
[45] Date of Patent: Aug. 20, 1985

[54] ELECTRIC MOTOR FAULT AND DYNAMIC BRAKING PROTECTION SYSTEM

[76] Inventor: Joseph J. Gartner, 335 W. Shore Dr., Wycoff, N.J. 07481

[21] Appl. No.: 634,561

[22] Filed: Jul. 26, 1984

[51] Int. Cl.³ ............................................. H02K 23/66
[52] U.S. Cl. .................................................... 318/434
[58] Field of Search ..................... 318/434; 361/44, 45, 361/46, 31

[56] References Cited

U.S. PATENT DOCUMENTS

| | | | |
|---|---|---|---|
| 3,579,051 | 5/1971 | Olsen | 330/8 X |
| 3,962,606 | 6/1976 | Burns et al. | 361/45 |
| 4,074,176 | 2/1978 | Parke et al. | 318/371 |
| 4,260,938 | 4/1981 | Joyes | 318/434 |
| 4,309,735 | 1/1982 | Morris | 318/434 X |
| 4,353,103 | 10/1982 | Whitlow | 361/45 |
| 4,355,267 | 10/1982 | Franz, Jr. et al. | 318/56 X |

Primary Examiner—William M. Shoop
Assistant Examiner—Bentsu Ro
Attorney, Agent, or Firm—Quast & Torrente

[57] ABSTRACT

Electric traction motors for rapid transit cars provide a first saturable reactor for sensing the current imbalance between the input and output leads of traction motor circuit, a second saturable reactor for sensing the current imbalance between the branches of the motor circuit, a current sensor in the excitation winding of each reactor to sense the current increase during a fault, a latching relay and a stepping relay both responsive to the output of each current sensor. A mode relay responsive to the dynamic braking control of the transit car connects either the sensor for the first reactor or the sensor for the second reactor to the latching and stepping relays depending upon the operating mode of the car. The latching relay functions to both disconnect the traction motors from their voltage supply and disable the car dynamic braking system upon a fault in either mode of operation. A motorman's reset button is provided to reset the latching relay after a fault to energize the motors and braking system. The stepping relay counts the number of faults and, after a predetermined number of faults has been reached, disables the reset button so that only a separate reset button accessible to maintenance personnel may be used. The reactor excitation windings are powered from an inverter circuit. The inverter has a fail safe circuit responsive to its output which actuates the stepping and latching relays to disable the car motors and braking system when the inverter output fails.

11 Claims, 2 Drawing Figures

ELECTRIC MOTOR FAULT AND DYNAMIC BRAKING PROTECTION SYSTEM

BACKGROUND OF THE INVENTION

1. Field of the Invention

This invention relates to protection systems for electric motors and more particulatly to an electric motor fault and dynamic braking protection system for rapid transit cars and the like.

2. Description of the Prior Art

Electric motor fault and dynamic braking protection systems are frequently employed in rapid transit cars having electric traction motors to protect the motors from faults occurring during various phases of motor operation. The electric traction motors are usually D.C. motors which operate at a high voltage, on the order of 600 volts, for example, and which draw substantial operating current. Faults may occur during normal motor operation because of arcing or flashover between the motor housing and energized portions of the motor or because of shorts to ground. Similarly, faults may also arise during the operation of the motors in a dynamic braking mode when the motors are disconnected from a power source and operate as electric generators to provide a power output which is dissipated in resistors. During dynamic braking mode, the operating current may also rise to dangerously high levels because the dynamic braking controller may malfunction or fail and thereby present an inadequately low resistive load to the motors. The protection systems usually operate to disable the motors by disconnecting them from their supply voltage after a fault in the normal operating mode and to disable the car dynamic braking system after a fault during the dynamic braking mode.

The "human" factor must also be considered in satisfactory operation of the aforementioned motor protection systems. Since abnormally high motor currents may arise because of operating transients or "temporary" conditions, the operator or motorman of the car must be able to reset the protective system after a fault has occurred so that normal car operation may be resumed. However, if the motorman is permitted to reset the system after an unlimited number of faults, he may inadvertently permit the motor to become damaged because of the repeated high current flows. Accordingly, many rapid transit systems require that a suitable motor protection system limit the ability of the motorman to reset the system after a predetermined number of faults has occurred. After the predetermined number of faults has been reached, the motorman should no longer be able to reset the system. Preferably, indicator means should be provided to enable yard maintenance personnel to identify the problem. A suitable motor protection system should also provide some fail safe protection for the protection system itself.

In many of the known protection systems, the operating potentials at various points in the motor circuits have been sensed by various means such as bridge detectors, for example, and the signal compared with a reference signal to produce an error or control signal which controls the traction motor line breakers. Since sensitivity and response time of the detectors are extremely important in systems of this type, many of the prior art arrangements have been found to be unsatisfactory in this regard. Additionally, the sensing detectors employed must be mechanically rugged and temperature stable to insure satisfactory operation in rapid transit systems where adverse environmentsl factors, such as temperature variations, mechanical vibration and wet weather, for example, may be encountered.

SUMMARY OF THE INVENTION

It is an object of this invention to provide an electric motor protection system for traction motors and the like wherein fault protection is provided not only during normal motor operation but also during motor operation in the dynamic braking mode.

It is a further object of this invention to provide an electric motor fault and dynamic braking protection system which uses reliable, mechanically-rugged saturable reactor means to sense current imbalance in various parts of the traction motor circuit.

It is a still further object of this invention to provide an electric motor fault and dynamic braking protection system for rapid transit cars which permits the motorman to reset the system for further operation after each of a limited number of faults has occurred but which prevents him from resetting the system after a predetermined number of faults has been reached.

It is an additional object of this invention to provide an electric motor fault and dynamic braking protection system for rapid transit cars wherein the magnitude of the motor lead current imbalance which is necessary to activate the protection system may be easily adjusted and the number of faults required for complete system shutdown may also be adjusted.

It is another object of this invention to provide an electric motor fault and dynamic braking protection system for rapid transit cars and the like which is easily installed on the cars and which requires only minimum maintenance.

It is an additional object of this invention to provide an electric motor fault and dynamic braking protection system for rapid transit cars and the like which provides fail safe protection for the protection system itself.

Briefly, the electric motor fault and dynamic braking protection system of the invention may be used with electric motor circuits having a normal operating mode in which the motor circuit input and output carry total motor current and a dynamic braking operating mode in which motors are opposed to dissipate energy. The protection system comprises first saturable reactor means for sensing current imbalance between the motor circuit input and output in the normal mode and second saturable reactor means for sensing current imbalance between opposing motors in the dynamic braking mode. Detector means are coupled to said saturable reactor means for producing fault signals when the reactor means sense a current imbalance of a predetermined magnitude in the operating modes. Bistable control means having first and second operating states is selectively coupled to the detector means to receive the fault signals therefrom. The control means is operable in the first state thereof to energize the motor circuit and permit dynamic braking and operable in the second state thereof to deenergize the motor circuit and prevent dynamic braking. The operating states of the control means are shiftable from the first state to the second state in response to the fault signals and from the second state to the first state in response to either a first reset signal or a second reset signal.

First manually operable reset signal producing means produce the first reset signal and second manually operable reset signal producing means produces the second reset signal. Counting means having first and second operating conditions is selectively coupled to the detector means and the first and second reset signal producing means. The counting means is operable in the first condition thereof to couple the first reset switching means to the control means so that the control means may be shifted from its second operating state to its first operating state in response to the first reset signal and operable in the second condition thereof to decouple the first reset signal producing means and the control means to thereby prevent shifting of the control means from the second state to the first state in response to the first reset signal. The operating conditions of the counting means are shiftable from the first condition to the second condition after receipt of a predetermined number of the fault signals and from the second operating condition to the first operating condition upon receipt of the second reset signal. Motor circuit mode responsive switching means selectively couple the first and second saturable reactor means and the detector means associated therewith to the control means and counter means.

The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
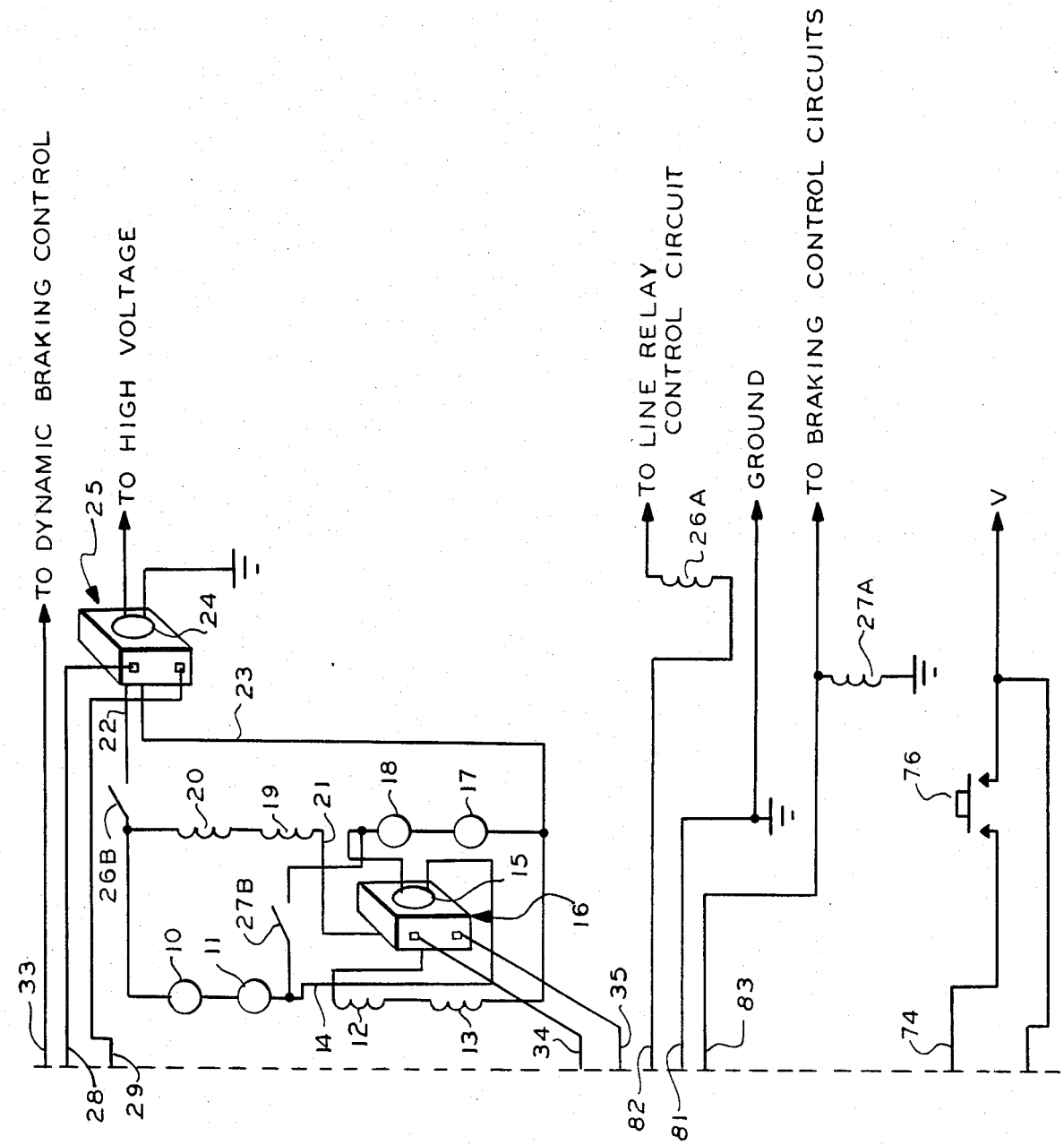
FIG. 1 is a schematic diagram of the traction motor circuit of a typical rapid transit car showing the saturable reactor sensing means of the motor protection system of the invention installed thereon and also showing the interface between the dynamic braking and other control circuits of the car and the protection system of the invention.
Figure 2:
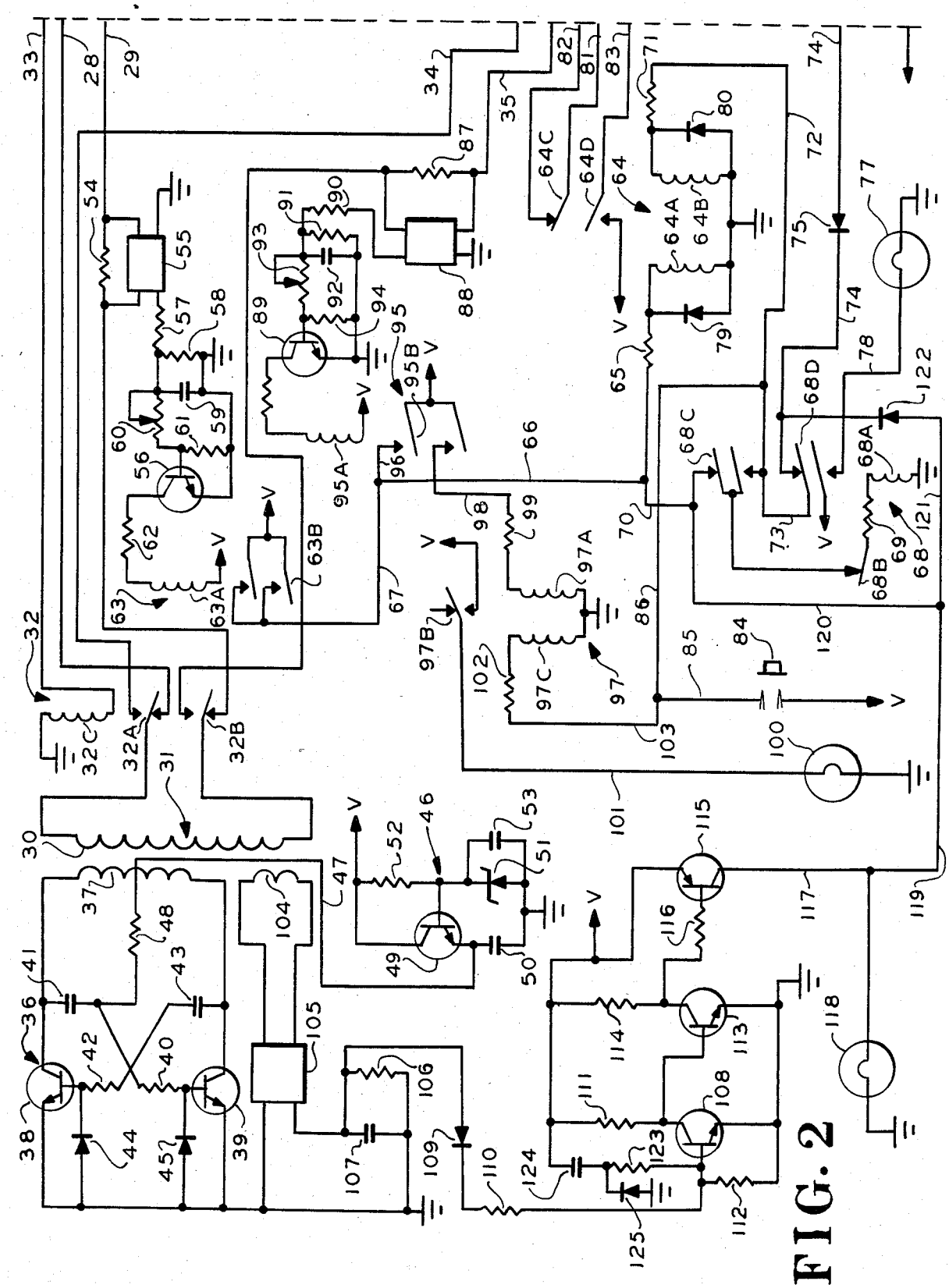
FIG. 2 is a circuit diagram of the electric motor fault and dynamic braking protection system of the invention.

Referring now to FIG. 1 of the drawings, there is shown the traction motor circuit arrangement for a typical rapid transit car having four D.C. electric motors wherein two of the motors are mounted on each truck of the car. As seen therein, the armatures 10 and 11 of the traction motors on one car truck are connected in series with the corresponding motor field windings 12 and 13 by means of a lead 14 which passes through the opening 15 in the core of a saturable reactor, indicated generally as 16. The armatures 17 and 18 of a second pair of motors which may be mounted on the second truck of the car are serially connected with their corresponding field windings 19 and 20 by means of a lead 21 which also passes through the reactor core opening 15. The two series circuits containing the two sets of motors are connected in a parallel circuit across a high voltage motor power supply source by motor circuit input lead 22 and motor circuit output lead 23 which both pass through the core opening 24 of another saturable reactor, indicated generally as 25. The high voltage applied to the parallel circuit containing the motors is generally on the order of 600 volts D.C. A line relay contact 26B which is controlled by the line relay coil 26A is located in lead 22 and serves to disconnect both sets of motors from the high voltage source when the line relay coil 26A is deenergized. The line relay and its contacts are a part of the motor control system usually employed in rapid transit cars. The dynamic braking mode is schematically represented by a dynamic braking relay contact 27B which is closed during dynamic braking and which serves to interconnect the midpoints of the two series motor circuits. This relay contact is controlled by a dynamic braking overload relay coil 27A which is deenergized during normal or non-braking operation. Again, the dynamic braking relay and its contacts are part of the car control circuits.

Since the saturable reactor 25 has the motor circuit input lead 22 passing through its opening 24 and the motor circuit output lead 23 also passing through the same opening, the reactor will sense any difference or imbalance in the total motor current passing through each load. Accordingly, if a fault such as arcing or flashover should occur in the motor circuit, the total output current passing through lead 23 will become less than the total input current passing through lead 22. In a similar fashion, during dynamic braking when dynamic braking contact 27B is closed, saturable reactor 16 will sense any imbalance between the current flowing in motor armatures 10 and 11 and the current flowing in motor armatures 17 and 18 thereby sensing the existence of a fault or other malfunction. Both of the saturable reactors may conveniently comprise an annular core of high-permeability material which is preferably spirally wound. Each reactor has an excitation winding which is toroidally wound about the annular core. The entire assembly of each reactor may be potted in a suitable material to protect the unit from the environment. Since the respective motor leads in the openings 15 and 24 of the reactors carry D.C. current, if a current imbalance occurs in the motor leads a magnetomotive force will be applied to each core which is proportional to the current imbalance. This force saturates the core and causes the impedance of the excitation winding to decrease.

The excitation winding on saturable reactor 25 is connected across the output winding 30 of a transformer, indicated generally as 31, by means of leads 28 and 29 and the contacts 32A and 32B of a mode relay, indicated generally as 32. The winding 32C of the mode relay is connected to the dynamic braking control of the rapid transit car by means of a lead 33. The winding on the saturable reactor 16 is also adapted to be connected to the output winding 31 of the transformer by means of leads 34 and 35 and the relay contacts 32A and 32B. When the traction motors are engaged in "normal" or non-braking operation, the excitation winding of the saturable reactor 25 is connected across the transformer secondary winding 30. When the dynamic braking control system of the car is actuated, however, mode relay coil 32C is energized and contacts 32A and 32B switch to disconnect saturable reactor 25 and to connect saturable reactor 16 to the output of transformer 31.

An inverter, indicated generally as 36, serves to excite a primary winding 37 of the transformer 31. The inverter 36 may conveniently comprise a free-running multivibrator circuit consisting of transistors 38 and 39 which have their bases and collectors cross-coupled by means of resistor 40 and capacitor 41 and resistor 42 and capacitor 43, respectively. The respective time constant of resistor 40 and capacitor 41 and resistor 42 and capacitor 43 determine the time during which the transistor 38 and 39 conduct and therefore determine the frequency of the ouput signal from the multivibrator. Diodes 44 and 45 protect the transistors 38 and 39, respectively, from excessive base-emitter current during the cutoff period. The multivibrator 36 is energized from a D.C. voltage source V through a voltage regulator circuit, indicated generally as 46, by means of a lead 47 and a resistor 48 which is connected to the junction of resistor 40 and capacitor 41. The voltage regulator circuit 46 has a regulating transistor 49 which has its collector-emitter circuit coupled between the voltage source V and ground by means of a filter capacitor 50. The base of the transistor 49 is clamped to a predetermined voltage by means of a Zener diode 51 and a resistor 52. A filter capacitor 53 serves to filter out transients and ripple from the voltage supply V. The resistor 48 insures that the transistor 39 conducts first and that transistor 38 is cur off when the multivibrator is started. In practice, the low voltage source V may be of the order of 37.5 volts D.C. and may be derived from the low voltage system of the rapid transit car.

When the excitation winding of the saturable reactor 25 is coupled across the output winding 30 of the transformer 31 during normal motor operation, a current sensing resistor 54 in lead 29 senses the current in the excitation winding. Since the motor circuit input and output leads pass through the central opening 24 of the saturable reactor 25, the current flow through these leads will be in opposite directions and when the currents are equal the saturable reactor 25 will present a maximum impedance across the secondary winding 30 of the transformer so that the current flow through resistor 54 will be at a minimum. If a fault should occur, the current flowing through the motor output lead 23 will become less than the current flowing through the motor input lead 22 so that the core of the reactor will saturate and the impedance presented by the excitation winding will decrease. This causes the current flow through the sensing resistor 54 to increase and produce a larger voltage drop across the resistor. The voltage drop across the resistor 54 is applied to the input of a full wave rectifier 55. The D.C. output of the rectifier is coupled to the base input of a transistor 56 by means of coupling resistors 57 and 58, filter capacitor 59 and an adjustable voltage-divider formed by adjustable resistance 60 and a fixed resistor 61. The emitter-collector circuit of the transistor 56 is coupled between ground and the low voltage D.C. source V by means of an output resistor 62 and the control winding 63A of a control relay, indicated generally as 63.

When the current flow through the sensing resistor 54 is at a minimum, which indicates a no-fault condition, the D.C. output from the rectifier is at a minimum and a minimum voltage is applied to the base input of transistor 56. The transistor 56 is biased to cutoff and no current flows through the winding 63A of relay 63. When the current through the sensing resistor 54 increases to a level indicative of a fault in the traction motor circuit, the output from rectifier 55 increases, the voltage across the voltage divider 60-61 increases and transistor 56 conducts to thereby energize the control relay winding 63A. The voltage at which the transistor 56 conducts is determined by the setting of the adjustable resistance 60 and may be set so that the relay coil 63A will not be energized until the current through the sensing resistor 54 reaches a predetermined value which indicates a fault in the motor circuit. By virtue of this arrangement, the protection system may be adjusted to prevent spurious operation caused by transient small current imbalances in the motor circuit input and output leads.

Control relay 6 has a set of contacts 63B which are adapted to connect the control winding 64A of a latching relay, indicated generally as 64, to the low voltage D.C. source V by means of a current limiting resistor 65 and leads 66 and 67. Relay contacts 63B also are adapted to connect the control winding 68A of a stepping relay, indicated generally as 68, to the same voltage source V by means of a current limiting resistor 69, stepping relay contacts 68B and 68C, lead 70 and the leads 66 and 67. The stepping relay 68 has a third set of contacts 68D which are adapted to perform three functions. The first function is to connect the reset winding 64B of the latching relay 64 to the D.C. low voltage source V by means of a current limiting resistor 71, leads 72, 73 and 74, a diode 75 and a motorman's reset switch 76 which is located in the motorman's compartment of the car. The second function is to connect a motor fault indicator lamp 77 to a low voltage D.C. source V by means of a lead 78. The third function relates to the dynamic braking mode of the system and will be described hereinafter. The stepping relay 68 is so designed that its relay contacts 68D will only operate on the third step for reasons which will be explained hereinafter.

The control winding 64A and a reset winding 64B of the latching relay 64 are provided with shunt diodes 79 and 80, respectively to prevent spurious relay operation and winding damage. The latching relay 64 has a first contact 64C which is serially connected in the line relay control circuit of the rapid transit car by means of leads 81 and 82, so that upon energization of the latching relay the control winding 26A of the line relay control of the car will be deenergized. A second contact 64D is adapted to connect the control winding 27A of the car dynamic braking overload relay to the low voltage D.C. source V by means of a lead 83, so that the dynamic braking relay coil 27A can be energized by either the operation of the latching relay 64 of the protection system or the dynamic braking control circuits of the rapid transit car.

During normal, no fault operation of the traction motors, the control relay 63 will not be energized since the current in the excitation winding of reactor 25 will be at or near minimum. When a fault occurs, however, this relay is energized and a voltage is applied through leads 66 and 67 and resistor 65 to energize the control winding 64A of the latching relay. Contacts 64C of the latching relay then open and deenergize the line relay control coil 26A which then opens line relay contact 26B in the motor leads to thereby remove the motors from the high voltage source to protect them from damage. When the control relay 63 is energized it also energizes the winding 68A of the stepping relay 68 through the leads 66, 67 and 70, and stepping relay contacts 68B and 68C. The stepping relay then steps and contacts 68C open to deenergize the stepping relay coil 68A. Since the stepping relay contacts 68D will not operate until the third step, the reset winding 64B of the latching relay is connected through contacts 68D, leads 72, 73 and 74, and diode 75 to the motorman's reset switch 76, so that the motorman can reset the protection system by depressing the reset switch 76 to thereby energize the latching relay reset winding 64B and cause latching relay contacts 64C to again complete the circuit through the line relay control winding 26A. The line relay control contacts 26B are again closed so that normal motor operation may be resumed.

If a second fault occurs, the foregoing operation will be repeated. However, when a third fault occurs, the stepping relay contacts 68D will operate so that the circuit between the motorman's reset button 76 and the latching relay reset winding 64B will be interrupted to thereby prevent the motorman from resetting the protective system. Both the traction motors and the protection system are disabled by the third fault. The operation of stepping relay contacts 68D also energizes the motor fault indicator lamp 77, which may be located underneath the car, so that maintenance personnel are advised that a third fault has occurred. After the completion of any necessary repair work, the maintenance personnel may energize the reset winding 64B of the latching relay by actuating a maintenance man's reset button or switch 84 which is also located underneath the car. The maintenance man's switch 84 serves to connect the latching relay reset coil 64B to the D.C. voltage source V by means of leads 85, 86 and 72 so that the stepping relay contacts 68D are bypassed.

During the dynamic braking mode, the motor protection system of the invention operates in much the same manner. When the motorman actuates the dynamic braking control on the car, mode relay 32 becomes energized and contacts 32A and 32B of the relay connect the excitation winding of the saturable reactor 16 across the secondary winding 30 of the transformer 31. When there is no current imbalance between the current flowing in motor armatures 10, 11 and the current in motor armatures 17, 18, the excitation winding of reactor 16 will present a maximum impedance to the transformer output winding 30 so that a minimum current will flow in lead 35. A current sensing resistor 87 is located in the lead 35 to sense this current and apply a corresponding voltage to the input of a full wave rectifier 88. The D.C. output from the rectifier is applied to the base of a transistor 89 by means of coupling resistors 90, 91, filter capacitor 92 and voltage-divider 93, 94. The transistor 89 operates in the same manner as transistor 56 in the motor fault sensing mode to energize the control winding 95A of a control relay, indicated generally as 95. Again, the adjustable resistance 93 in the voltage divider may be employed to adjust the cutoff point for the transistor 89 to thereby determine what magnitude of current flowing in the excitation winding for the saturable reactor 16 will cause the relay control winding 95A to be energized.

Control relay 95 is provided with contacts 95B which perform two functions. The first function is to connect both the control winding 64A of the latching relay 64 and the control winding 68A of the stepping relay 68 to the D.C. voltage source B by means of a lead 96 which is connected to the junction of leads 67 and 66. The second function is to connect the same low voltage V to the control winding 97A of a second latching relay, indicated generally as 97, by means of a lead 98 and a current limiting resistor 99. The latching relay 97 has a relay contact 97B which is adapted to energize a dynamic braking malfunction indicator lamp 100 from the D.C. low voltage source by means of lead 101. A reset winding 97C of latching relay 97 is adapted to be connected to the low voltage D.C. source V by means of current limiting resistor 102, leads 103 and 85 and the maintenance man's reset switch 84. The reset winding 97C is also adapted to be energized by the voltage source V when motorman's reset switch 76 is closed since it is connected to that switch by means of lead 74, diode 75, lead 74 stepping relay contact 68D, and leads 73, 86 and 103.

During car operation, when the motorman applies the car dynamic braking control, mode relay 32 is energized to connect the excitation winding of saturable reactor 16 across the transformer output winding 30. The current sensing resistor 87 will then sense any increase in current in the excitation winding resulting from a malfunction or other fault in the motor circuit and will then energize relay 95. Contacts 95B of this relay will then energize the control winding 64A of the first latching relay 64 and the control winding 68A of the stepping relay 68. At the same time, relay contacts 95B will also energize the control winding 97A of the second latching relay 97 to thereby energize the dynamic braking malfunction lamp 100. When the first latching relay 64 is energized, its contact 64D will close and thereby energize the control winding 27A of the dynamic braking control coil of the transit car to thereby disable the dynamic braking system of the car. The car line relay control circuit will also be opened by contacts 64C of the first latching relay 64 so that the motor circuit is disconnected from the high voltage source. Since stepping relay 68 will have stepped, the motorman may reset the protective system by actuating the reset switch 76 to energize the latching relay reset winding 64B through the stepping relay contacts 68D and the leads 72 and 73. If this is a first or a second fault, the motorman may reset the motor protection system by his reset switch 76 since contacts 68D of the stepping relay 68 will not yet have been actuated. If this is a third fault, however, contacts 68D of the stepping relay will open and prevent resetting of the system by the motorman, in which event, the system may only be reset by the maintenance man's reset switch 84 which is located underneath the car. It will be noted, however, that the three faults which must occur before the motorman is prevented from resetting the protection system may be faults which occur during either or both of the normal operating mode and the dynamic braking mode. Regardless of the mode in which the faults arise, any three successive faults will prevent resetting of the system by the motorman.

A fail safe circuit is provided for the motor protection system of the invention to disable the operating systems of the rapid transit car and the protection system itself should a malfunction occur in the protection system. To this end, a tertiary winding 104 is provided on the transformer 30 which is powered by the A.C. output from inverter 36. The output of winding 104 is applied to a rectifier 105 and the rectified output applied to a load resistor 106 through a filter capacitor 107. A positive bias voltage from the load resistor 106 is applied to the base input of a transistor 108 through a diode 109 and a coupling resistor 110. The transistor 108 is connected in a grounded emitter configuration with its collector connected to the D.C. power source V through a voltage dropping resistor 111. The positive bias voltage applied to transistor 108 through coupling resistors 110 and 112 causes transistor 108 to conduct and therefore to cut off a transistor 113 which is also connected in a grounded emitter configuration and which is supplied from the voltage source V through a voltage dropping resistor 114. The output from transistor 113 is applied to the base input of a transistor 115, which is also cut off, through a coupling resistor 116. The emitter of transistor 115 is connected to the D.C. voltage supply V and its collector is connected to ground by means of a lead 117 and a protection system failure indicator lamp 118. The collector of transistor 115 is also connected to the control winding 64A of latching relay 64 by leads 117, 119, 120 and 70 and by the current limiting resistor 65 and to the control winding 68A of stepping relay 68 by means of leads 117, 119 and 120 and the stepping relay contacts 68C.

In operation, if the inverter 36 should fail, transistor 108 cuts off and thereby causes transistors 113 and 115 to conduct. Transistor 115 then connects the protection system failure lamp 118 to the low voltage source V to thereby provide a visual indication of system failure. The transistor 115 also applies the voltage V to the control winding 64A of the latching relay 64 and the control winding 68A of the stepping relay 68 so that contacts 64C of the latching relay open the line relay control circuit of the car and disconnect the traction motors from the high voltage source. Contacts 64D of the latching relay also actuate dynamic braking coil 27A to disable the dynamic braking system. The stepping relay 68 steps and contacts 68C open. However, the low voltage output from transistor 115 is also applied to the stepping relay contacts 68D by means of a lead 121 and a diode 122 so that the control coil 68A of the stepping relay is energized through contacts 68C thereby causing the relay to step again. The stepping is repeated until the third step is reached and the relay contacts 68D are opened. At this time, both the protection system failure lamp 118 and the motor fault lamp 77 will be illuminated, the dynamic braking system disabled and the high voltage disconnected from the motor circuit. It may be noted that the current limiting resistor 71 in the reset coil circuit of latching relay 64 is so proportioned with respect to the current limiting resistance 65 in the control winding for the latching relay that the reset current which is required to actuate the reset coil is less than the latching current required for the control winding so that the latch relay will not be reset during this occurrence. The diode 75, which is in the lead 74 from the motorman's reset switch 76, serves to block the low voltage V obtained from the output of transistor 115 from entering the car supply system. Similarly, diode 122 prevents the low voltage from the transit car reset switch 76 and the car supply from reaching the fail safe circuit of the protective system of the invention.

The base input of transistor 108 of the fail safe circuit is also connected to the supply voltage V through a resistor 123, a capacitor 124 and a blocking diode 125, so that when the protection system of the invention is started, transistor 108 is turned on for a period of time which is determined by the time constant of resistor 123 and capacitor 124. If the multivibrator 36 does not start during this time period, the transistor 108 is cut off thereby causing transistors 113 and 115 to conduct and to completely shut down the system.

It is believed apparent that many changes could be made in the construction and described uses of the foregoing electric motor fault and dynamic braking protection system and many seemingly different embodiments of the invention could be constructed without departing from the scope thereof. For example, the protection system of the invention could be employed with A.C. motors as well as D.C. motors and the motors themselves could be employed in other applications such as hoisting or winching and the like. Accordingly, it is intended that all matter contained in the above description or shown in the accompanying drawings shall be interpreted as illustrative and not in a limiting sense.

What is claimed is:

1. An electric motor fault and dynamic braking protection system for electric motor circuits having a normal operating mode in which the motor circuit input and output carry total motor current and a dynamic braking operating mode in which motors are opposed to dissipate energy comprising first saturable reactor means for sensing current imbalance between the motor circuit input and output in the normal mode;

second saturable reactor means for sensing current imbalance between opposing motors in the dynamic braking mode;

detector means coupled to said first and second saturable reactor means for producing fault signals when the reactor means sense a current imbalance of a predetermined magnitude in the operating modes;

bistable control means having first and second operating states selectively coupled to said detector means to receive the fault signals therefrom, said control means being operable in the first state thereof to energize the motor circuit and permit dynamic braking and operable in the second state thereof to deenergize the motor circuit and prevent dynamic braking, the operating states of said control means being shiftable from said first state to said second state in response to said fault signals and from said second state to said first state in response to either a first reset signal or a second reset signal;

first manually operable reset signal producing means for producing said first reset signal;

second manually operable reset signal producing means for producing a second reset signal;

counting means having first and second operating conditions selectively coupled to said detector means and said first reset signal producing means, said counting means being operable in the first condition thereof to couple said first reset signal producing means to said control means so that said control means may be shifted from said second operating state to said first operating state in response to said first reset signal and operable in the second condition thereof to decouple said first reset signal producing means and said control means to thereby prevent shifting of said control means from said second state to said first state in response to said first reset signal, the operating conditions of said counting means being shiftable from said first condition to said second condition after receipt of a predetermined number of said fault signals and from said second operating condition to said first operating condition upon receipt of said second reset signal; and motor circuit mode responsive switching means for selectively coupling said first and second saturable reactor means and the detector means associated therewith to said control means and counter means.

2. An electric motor fault and dynamic braking protection system as claimed in claim 1 wherein each of said first and second saturable reactor means comprises a saturable core having an aperture therein, the aperture of said first reactor core being adapted to receive the motor circuit input and output leads in the normal operating mode and the aperture of said second reactor core being adapted to receive the leads of opposing motors in the dynamic braking mode, and an excitation winding disposed on said core for excitation thereof; and a source of alternating current is selectively coupled to the excitation windings of both reactors by said motor circuit mode responsive switching means, so that the excitation winding of each of said reactors is adapted to be energized by said alternating current source.

3. An electric motor fault and dynamic braking protection system as claimed in claim 2 wherein fail safe circuit means is provided having an input coupled to said alternating current source and an output coupled to said counting means and said control means, and fail safe circuit means being operable to produce a fail safe signal in response to a failure of the output from said alternating current source;

said control means may be shifted from said first operating state thereof to said second operating state thereof in response to said fail safe signal; and said counting means may be shifted from said first operating condition thereof to said second operating condition thereof in response to said fail safe signal.

4. An electric motor fault and dynamic braking protection system as claimed in claim 2 wherein said bistable control means comprises a latching relay having the control winding thereof adapted to be energized by said fault signals and the reset winding thereof adapted to be energized by said first and second reset signals;

said counting means comprises a stepping relay having the control winding thereof adapted to be energized by said fault signals; and said detector means comprises first current sensing means for sensing the magnitude of the current in the excitation winding of said first reactor means and producing a first control voltage proportional thereto, second current sensing means for sensing the magnitude of the current in the excitation winding of said second reactor means and producing a second control voltage proportional thereto, first control relay means responsive to said first control voltage for producing one of said fault signals whenever the excitation winding current sensed by said first current sensing means exceeds a predetermined level, and second control relay means responsive to said second control voltage for producing one of said fault signals whenever the excitation winding current sensed by said second current sensing means exceeds a predetermined level.

5. An electric motor fault and dynamic braking protection system as claimed in claim 2 wherein the electric motor circuit is the traction motor circuit of an electric railway car;

said first manually operable reset signal producing means includes a first reset switch in the motorman's compartment of the car;

said second manually operable reset signal producing means includes a second reset switch located underneath the car; and said motor circuit mode responsive switching means is actuated by the dynamic braking control of the car.

6. An electric motor fault and dynamic braking protection system as claimed in claim 3 wherein said alternating current source comprises an inverter circuit, and transformer means having a primary winding and two secondary windings, said primary winding being coupled to the output of said inverter circuit for energization thereby and one of said secondary windings being selectively coupled to the excitation windings of said first and second saturable reactor means by said motor circuit mode responsive switching means; and said fail safe circuit means comprises fail safe switching means responsive to the output of the other of said transformer secondary windings for producing said fail safe signal in the absence of an output from said other transformer secondary winding.

7. An electric motor fault and dynamic braking protection system as claimed in claim 4 wherein first indicator lamp means is coupled to said counting means and is actuated by the shifting of said counting means from said first operating condition thereof to said second operating condition thereof to thereby indicate that said predetermined number of said fault signals has been received; and second indicator lamp means is coupled to the output of said second control relay means and is actuated in response to said fault signals therefrom to thereby indicate the occurrence of a fault in the dynamic braking operating mode.

8. An electric motor fault protection system for electric motor circuits having a normal operating mode in which the motor circuit input and output carry total motor current comprising saturable reactor means for sensing current imbalance between the motor circuit input and output in the normal mode;

detector means coupled to said saturable reactor means for producing fault signals when the reactor means sense a current imbalance of a predetermined magnitude in the operating mode;

bistable control means having first and second operating states selectively coupled to said detector means to receive the fault signals therefrom, said control means being operable in the first state thereof to energize the motor circuit and operable in the second state thereof to deenergize the motor circuit, the operating states of said control means being shiftable from said first state to said second state in response to said fault signals and from said second state to said first state in response to either a first reset signal or a second reset signal;

first manually operable reset signal producing means for producing said first reset signal;

second manually operable reset signal producing means for producing a second reset signal;

counting means having first and second operating conditions selectively coupled to said detector means and said first reset signal producing means, said counting means being operable in the first condition thereof to couple said first reset signal producing means to said control means so that said control means may be shifted from said second operating state to said first operating state in response to said first reset signal and operable in the second condition thereof to decouple said first reset signal producing means and said control means to thereby prevent shifting of said control means from said second state to said first state in response to said first reset signal, the operating conditions of said counting means being shiftable from said first condition to said second condition after receipt of a predetermined number of said fault signals and from said second operating condition to said first operating condition upon receipt of said second reset signal.

9. An electric motor fault protection system as claimed in claim 8 wherein
said saturable reactor means comprises
a saturable core having an aperture therein, said aperture being adapted to receive the motor circuit input and output leads, and
an excitation winding disposed on said core for excitation thereof; and
a source of alternating current is coupled to said excitation winding for energization thereof.

10. A dynamic braking protection system for electric motor circuits having a dynamic braking operating mode in which motors are opposed to dissipate energy comprising
saturable reactor means for sensing current imbalance between opposing motors in the dynamic braking mode;
detector means coupled to said saturable reactor means for producing fault signals when the reactor means sense a current imbalance of a predetermined magnitude in the operating mode;
bistable control means having first and second operating states selectively coupled to said detector means to receive the fault signals therefrom, said control means being operable in the first state thereof to permit dynamic braking and operable in the second state thereof to prevent dynamic braking, the operating states of said control means being shiftable from said first state to said second state in response to said fault signals and from said second state to said first state in response to either a first reset signal or a second reset signal;
first manually operable reset signal producing means for producing said first reset signal;
second manually operable reset signal producing means for producing a second reset signal;
counting means having first and second operating conditions selectively coupled to said detector means and said first reset signal producing means, said counting means being operable in the first condition thereof to couple said first reset signal producing means to said control means so that said control means may be shifted from said second operating state to said first operating state in response to said first reset signal and operable in the second condition thereof to decouple said first reset signal producing means and said control means to thereby prevent shifting of said control means from said second state to said first state in response to said first reset signal, the operating conditions of said counting means being shiftable from said first condition to said second condition after receipt of a predetermined number of said fault signals and from said second operating condition to said first operating condition upon receipt of said second reset signal.

11. A dynamic braking protection system as claimed in claim 10 wherein
said saturable reactor means comprises
a saturable core having an aperture therein, said aperture being adapted to receive the leads of opposing motors in the dynamic braking mode, and
an excitation winding disposed on said core for excitation thereof; and
a source of alternating current is coupled to said excitation winding for energization thereof.

* * * * *